United States Patent Office.

CARLOS P. HOUGHTON, OF GEORGETOWN, DISTRICT OF COLUMBIA.

Letters Patent No. 108,909, dated November 1, 1870.

IMPROVEMENT IN THE MANUFACTURE OF FERTILIZERS.

The Schedule referred to in these Letters Patent and making part of the same.

*To all whom it may concern:*

Be it known that I, CARLOS P. HOUGHTON, of the city of Georgetown, in the District of Columbia, have invented a new and improved Method of Manufacturing Manures for Agricultural Purposes, of which the following is a full, clear, and exact description.

The nature of my invention consists in neutralizing the caustic properties of native marl, as known and so called in the States of Virginia and North Carolina, and in preventing, during the process of its manufacture, the recrystallization of the elements of the same.

The article designated "marl" in Virginia and elsewhere, is composed of various marine and animal substances in decomposed, crystallized, and partly decomposed states, of which lime is the base; but its use as a manure in the crude or raw state has been found to be injurious instead of beneficial to growing crops, on account of its burning or caustic quality.

The subjoined treatment of this native marl will effectually relieve it of its caustic properties without in the least impairing, but rather fully developing, its latent fertilizing qualities, producing a manure for agricultural use equally as efficient but considerably more economical than Peruvian guano.

Hitherto all other treatments of this marl have failed in preventing recrystallization, and a consequent loss of its virtues as a manure; but in my method of manipulation by separate applications of the within-named solutions, the difficulty is easily obviated.

After or before pulverizing the crude marl I apply to it a solution composed of soda-ash, niter, and salt, with the addition of animal gall, saturating or wetting the same with this preparation, and subsequently applying to the mass a solution of pearlash or other alkali, and sal ammonia, incorporating the whole by manipulation by hand or machinery, adding finely-ground bones and Peruvian guano in suitable quantities to render the whole a valuable and economical manure for agricultural purposes, as well as for fruits, flower-plants, garden-trees, and other productions of the soil.

The following are the ingredients which I prefer to use in the manufacture of my guano, together with their several proportions:

First, I dissolve ten pounds soda-ash to four pounds saltpeter in boiling water, (218° Fahrenheit,) separately, and then mix the same together.

Second, nine pounds sal ammonia and same quantity of pearlash dissolved in hot water, (127° Fahrenheit,) separately, and then mix together.

Third, two gallons animal gall, mixed with the sal ammonia and pearlash, (*i. e.* liquid ammonia.)

These combinations form an alkali which effectually relieves the marl of all fiery or burning substances, and produces a fertilizer superior to the best Peruvian guano.

The foregoing calculation (allowing for evaporation) will make forty-four gallons of each kind of liquid.

Having thus fully described my invention,
What I claim as new, and desire to secure by Letters Patent, is—

1. The improved fertilizer herein described, composed of marl treated with alkaline salts, substantially as set forth.

2. The combination of marl, alkaline salts, and bones, in the manner described.

3. The combination of marl, soda-ash, or its equivalent, and ammoniacal salts, so as to produce a fertilizer, as described.

CARLOS P. HOUGHTON.

Witnesses:
CHRIS. U. CALLAN,
GEO. C. LAMBRIGHT.